United States Patent [19]

Kolosov et al.

[11] 4,186,893

[45] Feb. 5, 1980

[54] APPARATUS FOR WINDING STRIPS

[76] Inventors: Ivan A. Kolosov, ulitsa Astrakhanskaya 118, kv. 54; Jury E. Ivanyatov, ulitsa M. Zatonskaya, 21; Vladimir N. Pevnev, ulitsa Ogorodnaya 223, kv. 31, all of Saratov, U.S.S.R.

[21] Appl. No.: 730,650

[22] Filed: Oct. 7, 1976

[30] Foreign Application Priority Data

Oct. 14, 1975 [SU] U.S.S.R. ............... 2180721[I]

[51] Int. Cl.² ............ B65H 19/04; B65H 35/02; B65H 17/20
[52] U.S. Cl. .................... 242/56.9; 226/193; 226/195; 242/67.2; 242/68
[58] Field of Search ........... 242/56.9, 56.2, 56.3, 242/56.4, 56.5, 56.6, 67.1 R, 67.3 R, 67.4, 54 R, 68.3, 68, 46.2, 46.21, 46.4, 71.8, 71.2, 207, 210, 46.3, 129.51, 100, 129.6, 100.1, 129.61, 96, 129.7, 86.5, 29, 80, 86.8; 226/193, 195

[56] References Cited

U.S. PATENT DOCUMENTS

| 1,452,965 | 4/1923 | Ferris | 242/56.9 |
| 1,675,863 | 7/1928 | Parsons | 242/67.1 R |
| 1,918,984 | 7/1933 | Richardson | 242/67.3 R |
| 3,322,359 | 5/1967 | Dales et al. | 242/56.9 X |
| 3,853,280 | 12/1974 | Pennisi et al. | 242/56.9 |

Primary Examiner—George F. Mautz
Attorney, Agent, or Firm—Lackenbach, Lilling & Siegel

[57] ABSTRACT

Disclosure is made of an apparatus for winding strips, preferably in longitudinal cutting of a tape of separating material for storage battery electrodes, wherein at least two drawing rollers are connected to a drive for their rotation so as to provide for the tape movement through a cutting mechanism; at least two receiving shafts are coupled to said drive by means of a friction clutch, the shaft axes running in parallel with the axes of said drawing rollers; said receiving shafts are provided with a set of spools for winding adjacent strips on said spools of different receiving shafts; said receiving shafts are also provided with longitudinal slots extending along the entire length thereof, and spool is provided with a stop received in the longitudinal slots of the receiving shafts to provide for tensioning of the tape upon slacking.

6 Claims, 3 Drawing Figures

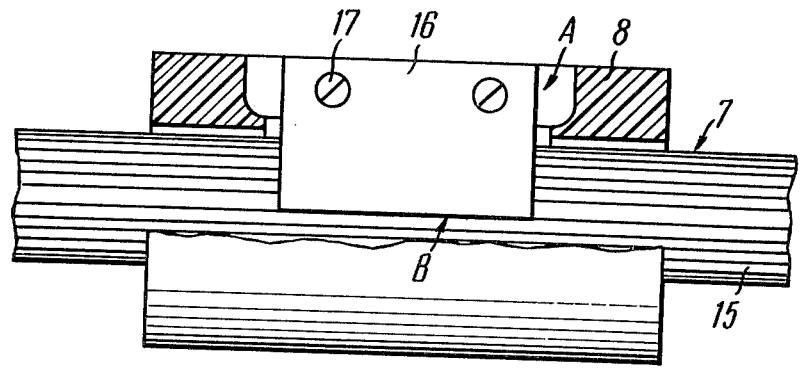
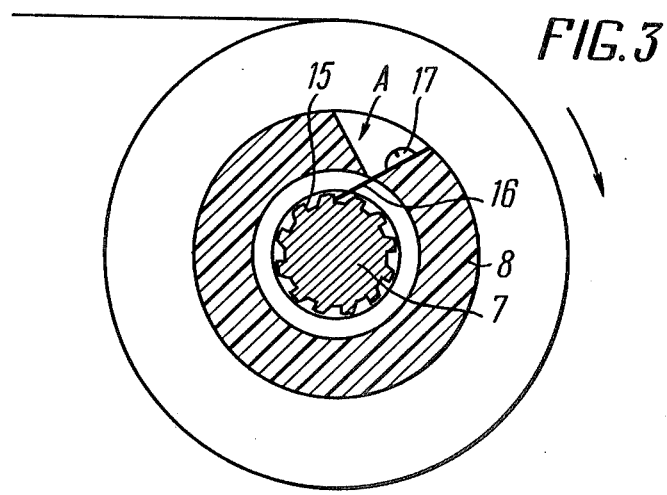

APPARATUS FOR WINDING STRIPS

The present invention relates to the manufacture of storage batteries, and more particularly, to an apparatus for winding strips on spools in longitudinal cutting of a tape of separating material fed from a roll. The apparatus forms a component part of an automatic machine for longitudinal cutting of thermofusible material into strips for making separators for storage battery electrodes, which is incorporated in an automatic storage battery assembly line.

The apparatus according to the invention may be used in the manufacture of storage batteries having separators made of flexible materials in the form of linen, non-wooven felt, paper and the like, such as in the manufacture of cadmium-nickel storage batteries of improved capacity to be used in aviation, electric cars and other vehicles which comprise electrodes having very thin and lowstrength separators.

The problem of automation of longitudinal cutting of tapes of thin and low-strength materials for separators of storage battery electrodes consists in the fact that such materials are stretched with elastic deformation under low loads resulting in narrowing of the strip during the winding and form a bulge before a cutting blade upon slacking thus impairing the cutting conditions.

These factors hamper the employment of known apparatus for winding strips so that cutting of separators and packaging of electrodes in them in the manufacture of high capacity storage batteries both in the USSR and abroad are effected manually or using semi-automatic equipment.

Known in the art is an apparatus for cutting punched metal screen into cards (cf. USSR Inventor's Certificate No. 303681, 1971, H 01 m 35/00) which are magnetizable under low loads. This apparatus comprises falling-and-cutting rolls mounted on a base and special rolls for tensioning and streightening which are arranged before the falling-and-cutting rolls in parallel therewith, the diameters of the tensioning rolls and falling and cutting rolls being selected on the basis of the ratio of 0.98 to 1.

This apparatus enables uniform tensioning along the entire width of the screen due to its stretching with residual deformation between two pairs of rolls prior to cutting into cards.

However, said apparatus cannot provide for uniform tensioning of a web along the entire width thereof in longitudinal cutting thereof into strips with separate winding of each strip on an independent spool when elastically deformed materials are used, such as separating materials.

Known in the art is a machine for longitudinal cutting of a web into strips (cf. USSR Inventor's Certificate No. 166458, 1964, D 06H 7/04) which involves separate winding of strips on independent shafts and comprises several pairs of drawing rollers having a drive for their rotation which provides for movement of the web during the cutting, and two receiving drums mounted adjacent to the rollers and comprising spools rigidly fitted on a common shaft which is coupled to the drive by means of a friction clutch which maintains a constant speed of winding of the cut strip on the spools.

This apparatus also cannot enable uniform tensioning of strips during the coiling because there is no provision for initial independent tensioning of each individual strip prior to separation so that slack is accumulated at various points along the width of the material thus impairing the cutting and winding conditions.

Therefore, the above-described prior art apparatus have substantial disadvantages making making them unsuitable for independent winding of strips in longitudinal cutting of thin and low-strength materials for separating storage battery electrodes.

The main disadvantage of prior art apparatus consists in that they do not provide for initial tensioning of the strips and thus cannot provide for uniform tensioning of a strip during the cutting when several strips are wound. The provision of independent friction clutches for each individual spool would have considerably complicated the machine and resulted in difficulties in assembly and disassembly of the shafts and spools.

It is an object of the invention to eliminate the above-mentioned disadvantages.

Another object of the invention is to provide a simple and reliable apparatus for winding strips in longitudinal cutting of a tape of separating material for storage battery electrodes which enables uniform tensioning of the tape along the entire width upon initial feeding of each strip to a spool and opportunity of controlling the uniformity of the tape tensioning during cutting thereof into strips using automatic equipment.

The above objects are accomplished by that in an apparatus for winding strips comprising at least two drawing rollers having a drive for their rotation thereof which provides for the tape movement during cutting, and at least two receiving shafts coupled to the drive by means of friction clutches which are provided with a set of spools for winding adjacent strips on spools of different receiving shafts, the axes of the drawing rollers and receiving shafts running in parallel with one another, in accordance with the invention, the receiving shafts are provided with longitudinal slots extending along the entire length thereof, and each spool is provided with a stop received in the longitudinal slots of the shafts to provide for tensioning of the tape upon slackening.

In the apparatus for winding strips, the spools are preferably made with recesses accommodating leaf springs forming the stops.

The apparatus for winding strips in longitudinal cutting of a tape of separating material for storage battery electrodes according to the invention enables automatic cutting of separating material for mechanized packaging of electrodes of high-capacity cadmium-nickel storage batteries such as those to be used in aviation, electric cars and other applications which comprise electrodes having very thin and low-strength separators, and this is achieved due to the fact that the apparatus has the provisions for controlling uniform tensioning of the tape along the entire width during longitudinal cutting thereof into strips with separate winding of each strip on an independent spool. This is accomplished due to the fact that the receiving shafts are provided with longitudinal slots extending along the entire length thereof and each spool has a stop which enables rotation of the spool in the direction of the shaft rotation to control tensioning of individual strips.

The provision of recesses in the intermediate part of the spools for accommodating leaf springs forming the stops to cooperate with the slots of the shafts simplifies the construction of the apparatus and ensures high reliability of the assemblies thereof in operation.

The apparatus is simple in the manufacture, adjustment and operation and may find a wide application in other manufacturing industries where moving tape materials are processed.

The invention will now be described in details with reference to specific embodiment thereof illustrated in the accompanying drawings, in which:

FIG. 1 diagrammatically shows a general view of the apparatus for winding strips;

FIG. 2 is a general view of a spool assembled with a receiving shaft;

FIG. 3 is a sectional view of the assembly shown in FIG. 2.

Figure 1:
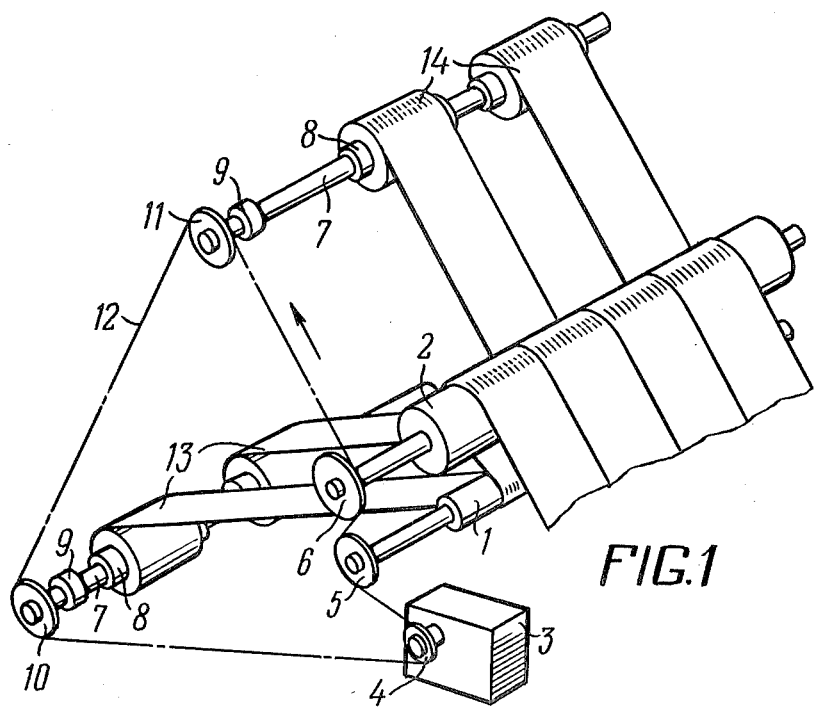

The apparatus for winding strips according to the invention comprises two drawing rollers 1 and 2 (FIG. 1) mounted in parallel and in a spaced relationship to each other, the rollers being connected to a drive 3, such as by means of a chain transmission including sprockets 4, 5 and 6. The roller 1 provides for tensioning of a material on the roller 2 due to the fact that the ratios of diameters of the sprockets 5 and 6 and rollers 1 and 2 are selected in such a manner that the surface speed of the roller 1 is somewhat greater (by 5-10%) than the surface speed of the roller 2. The roller 2 is made e.g. with rubberized surface, and the roller 1 has a smooth metal surface thus providing for continuous tensioning of cut strips on the roller 2 and drawing of the entire tape through a cutting mechanism (not shown).

Receiving shafts 7 supporting spools 8 are mounted adjacent to and in parallel with the drawing rollers 1 and 2. One shaft 7 is mounted below the level of the drawing rollers 1 and 2, and another shaft 7 is located above the level of the drawing rollers 1 and 2. At one end, the shafts 7 are connected, by means of friction clutches 9, to sprockets 10 and 11 which are connected to the drive 3 by means of a common chain 12, and the other ends of the shafts 7 are journalled in removable bushings fixed in a base (not shown). The connection of the shafts 7 to the friction clutches 9 is preferably a quick-detachable connection so as to allow for quick removal of the receiving shafts 7 during disassembly and assembly of the spools 8. After cutting the tape of e.g. separating material into strips 13 and 14, the strips are wound on the spools 8 alternating the strips fed to the spools 8 of the lower and upper shafts 7, and for that purpose the spools 8 are located on the shafts 7 opposite to respective strips. Both receiving shafts 7 are provided with longitudinal slots 15 (FIGS. 2 and 3) extending along the entire length thereof, and each spool 8 has recesses "A" each accommodating a leaf spring 16 fastened on the spool 8 e.g. by means of screws 17, the spring being received with its end "B" in the slots 15 of the shaft 7. The spool may have a stop of a different design, such as in the form of a spring-loaded pawl fixed to the end face of the spool 8. In any case, it is important that the spool 8 is to be connected to the shaft 7 by means of a stop which enables the rotation of the spool in the rotational direction of the shaft 7 for tensioning slacked strips.

The apparatus for winding strips according to the invention functions in the following manner.

The ends of the strips 13 and 14 cut before the cutting mechanism (e.g. manually) are secured to the spools 8 (FIG. 1) with alternation of adjacent strips 13, 14 which are fed to the lower and upper shafts 7, respectively. By rotating the spools 8, with the spring 16 of the stop slipping over the slots 15 (FIGS. 2 and 3), the tensioning of the tape over the entire width is adjusted. Then the drive 3 is engaged (FIG. 1), and the tape is cut by drawing it through the cutting mechanism with resultant winding of the strips 13 and 14 on respective spools 8. The main force required for drawing the tape through the cutting mechanism (not shown) is provided by the drawing roller 2 due to the rubberized surface thereof. The force urging the tape against the rubberized under the action of the slipping rotary roller 1, as well as by the force of tensioning of each strip 13 and 14 of the tape on the spools 8, is provided by the friction clutches 9. Under uniform tensioning of the strips 13 and 14 on the respective spools 8, the tape is uniformly drawn by the roller 2 to enable the tape cutting without wrinkles and bulges before the cutting mechanism. In case of non-uniform tensioning of the tape material and formation of sagging, slack sections along the tape width, individual strips 13, 14 are tensioned by rotating respective spools 8 relative to the receiving shaft 7 in the rotational direction of the shaft thus evening the tensioning of the slacked sections along the width of the material being cut.

The apparatus for winding strips according to the invention provides for automatic cutting of separating material for mechanized packaging of electrodes of storage batteries comprising very thin and low-strength separators due to the fact that the receiving shafts 7 for winding the cut strips 13 and 14 in the apparatus are provided with longitudinal slots 15, and the spools 8 are provided with springs 16 forming the stops cooperating with the slots 15 upon tensioning slacked strips 13, 14 to ensure uniform tensioning of the tape of separating material cut into strips, along the entire width. The provision of stops in the form of leaf springs 16 mounted in the spools 8 in the recesses provided in the intermediate part thereof simplifies the apparatus thus making it reliable in operation.

The apparatus is simple in the manufacture, adjustment and operation and may find a wide application in other manufacturing industries where moving tape materials are processed.

What is claimed is:

1. An apparatus for winding strips in longitudinal cutting of a tape which provides for uniform tensioning of the tape along the entire width thereof, the apparatus comprising: at least two substantially parallel drawing rollers adapted to initially engage all the strips and advance the same, prior to separation, at a substantially uniform velocity; at least two spaced receiving shafts substantially parallel to said drawing rollers; a plurality of spools spaced from each other on said receiving shafts and positioned to receive associated strips from said drawing rollers, said spools being supported on predetermined portions of said receiving shafts and having recesses; locking means associated with each of said spools for locking said spools to said receiving shaft in only one relative rotational direction therebetween, comprising a plurality of longitudinal slots along at least said predetermined portions of said receiving shafts and slot engaging means on said spools, said slot engaging means comprising leaf springs extending through said recesses and into engagement with said slots, each of said spools being selectively rotatable in the other relative rotational direction with respect to its associated receiving shaft to thereby permit selective tensioning of the strips and to permit substantial equalization of the tension in all the strips; and drive means for simultaneously rotating said drawing rollers and receiving shafts to cause the movement of the strips and winding of the same on said spools at substantially uniform tensions and speeds.

2. An apparatus as defined in claim 1, wherein two receiving shafts are provided, said spools being spaced from each other and positioned on said receiving shafts to receive alternate strips on different ones of said receiving shafts.

3. An apparatus as defined in claim 1, wherein at least one of said drawing rollers is provided with a friction producing surface.

4. An apparatus as defined in claim 3, wherein said one drawing roller is provided with a rubberized surface.

5. An apparatus as defined in claim 1, wherein said drive means includes sprocket wheels on said receiving shafts and said drawing rollers, and a common chain drive engaged with all said sprocket wheels to assume equal rotational velocities of said receiving shafts and said drawing rollers.

6. An apparatus as defined in claim 5, wherein said receiving shafts are connected to said sprocket wheels by means of friction clutches.

* * * * *